Patented Dec. 29, 1942

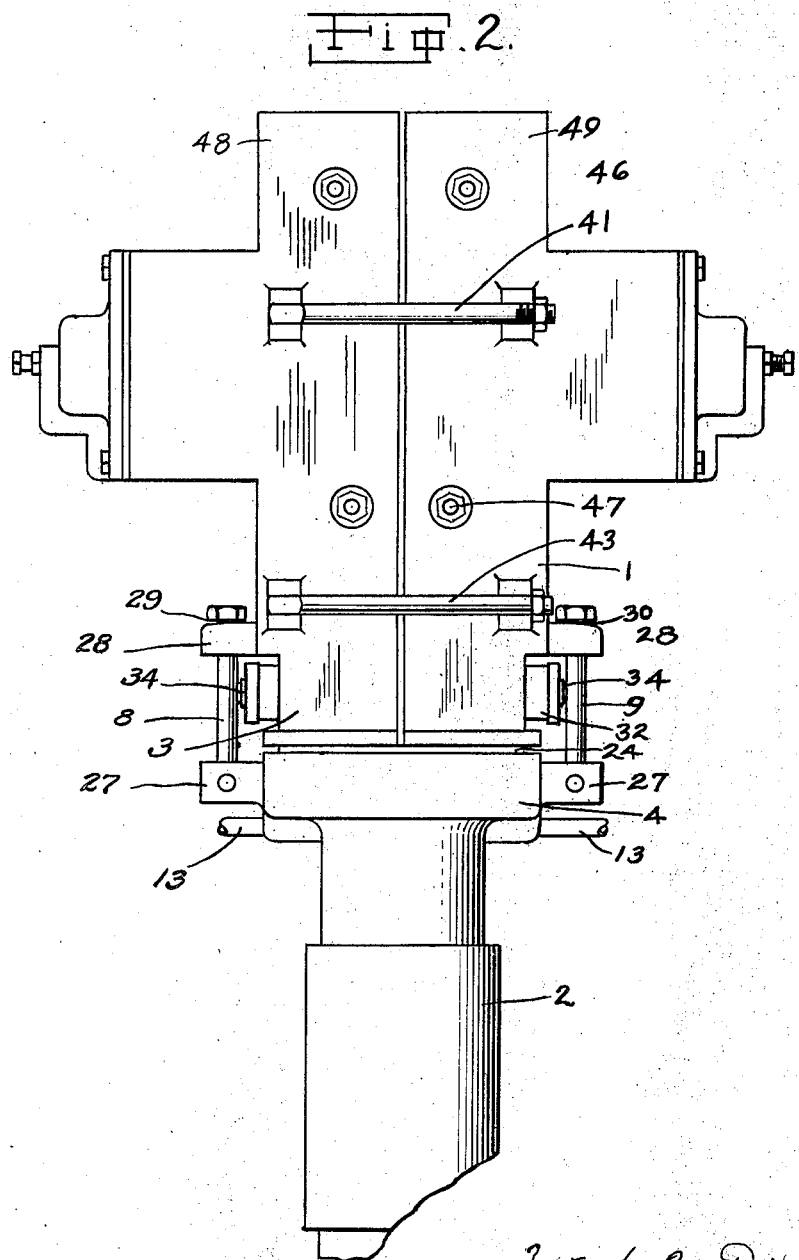

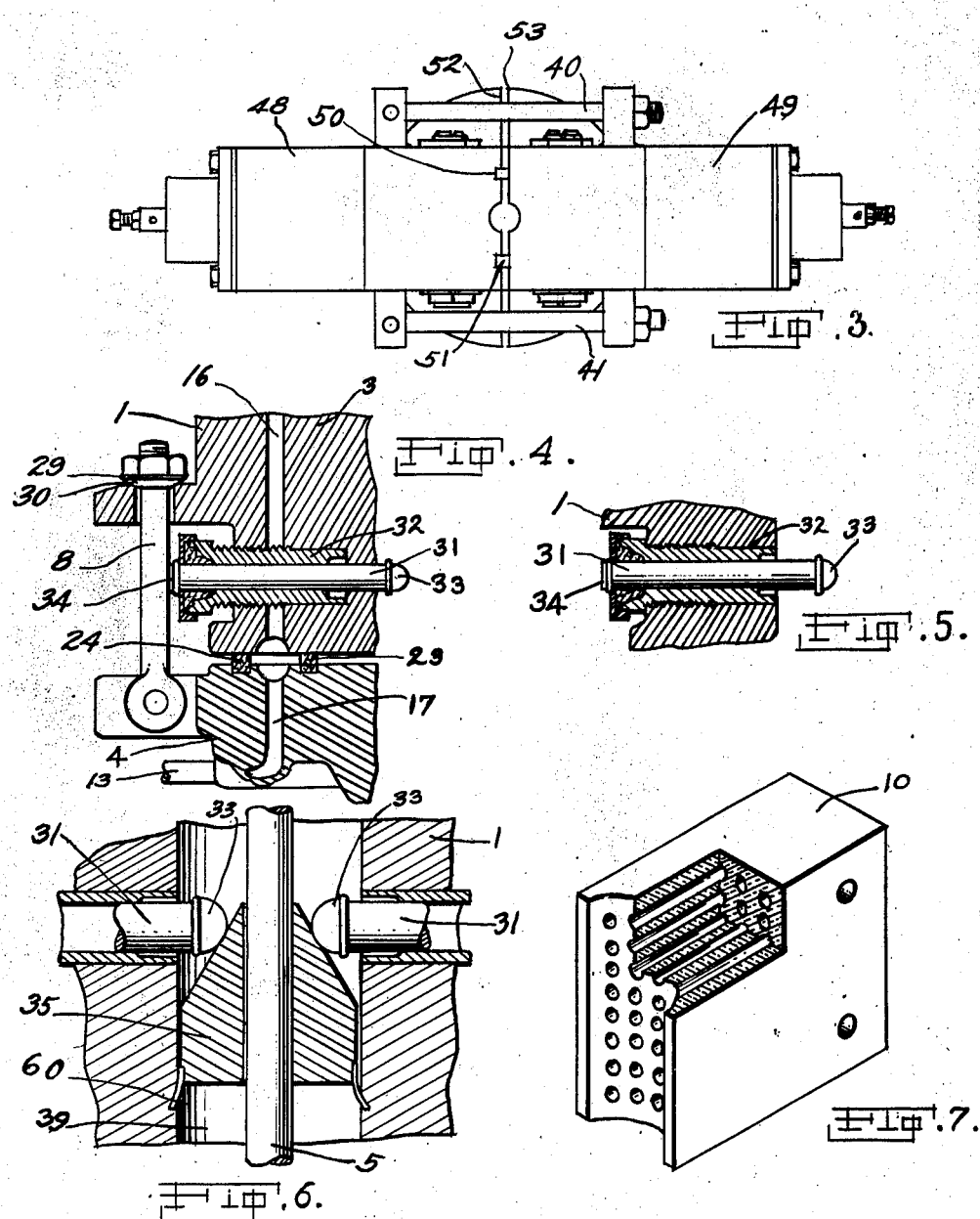

2,306,617

UNITED STATES PATENT OFFICE 2,306,617

REMOTE CONTROL-SAFETY TRIP HYDRAULICALLY OPERATED OIL SAVER

Wade W. Dick, Springfield, Ill.

Application October 8, 1940, Serial No. 360,309

13 Claims. (Cl. 166—14)

My invention relates to improvements in oil savers, and especially for oil savers such as are used in connection with operations around an oil well; an object being in my invention to provide an oil saver particularly serviceable when swabbing an oil well.

A purpose of my invention is to provide improvements in oil savers such as may be utilized as a sort of stuffing box or oil pressure shield around the oil well cable, preferably at a position just above the usual oil well casing extending into the ground.

Oil savers that have been in common use heretofore, have not been made sectional in their construction, and have been firmly secured to the oil well casing. Consequently, when a swabbing apparatus is lifted out of an oil well casing, it is most essential that the operator watch very cautiously, as the swabbing tool approaches the top of the casing, to prevent the swabbing tool or terminal cable socket near it from striking the oil saver and causing a wreck of the oil saver equipment; and, also, loss of the swabbing tool.

Obviously, this is due to the fact that if the swabbing tool or the cable socket strikes an oil saver of the type that has been commonly used, then something must give; and the outcome will be a wrecked oil saver or a broken cable permitting the swabbing tool to drop back down in the well, or both may happen with a resulting danger to the operator and expense of recovering lost tools.

It is one of my purposes therefore, in this invention, to provide not only a safe protection for an oil saver operator by furnishing a remote control for the hydraulic adjustments of the oil seal clamp in the oil saver; but, also, to provide in the same invention, a sectional oil saver unit wherein kick-out clamps which hold the respective sections together, may become automatically released permitting the upper section of the oil saver unit to be carried upwardly with the rising cable, as the cable socket moves a release lug in position to disconnect such clamps permitting the parting of the detachably connected sections of the oil saver unit; thus saving the oil saver in an emergency case of an over-sight or an error of the operator.

To oil well drilling experts it has been a common practice to utilize some sort of oil saver in connection with an oil well swabbing operation; but in connection with such practices, it has heretofore been an oil saving operation utilizing equipment for this purpose, which necessarily involved many hazards to the lives and safety of operators whose duty it was to service and control such oil saving equipment; for the reason that such duties require the operator to be stationed near the oil saver at all times, to make needed adjustments in the oil saver equipment, with the result that the operator thus on duty would be subjected to the constant danger of becoming caught exactly in the path of a tragic oil well fire, with no chance to escape the same, since his operating position would normally place him above the ground on a platform or cat-walk and the like, to be where he could manipulate the service and control for such oil saving equipment when it is in operation.

It is, therefore, a purpose in the development of my invention, to inaugurate a teaching in the service and control of oil saving equipment, as well as to develop an improved type of oil saving equipment, wherein this equipment may be operatively controlled by remote control, by utilizing a hydraulically operated remote control of the selective adjustments in the oil saving clamp adapted to resiliently engage the oil well cable about which my oil saver is operatively assembled.

In connection with the operative construction of my oil saver unit, I am, at the same time, providing in this invention, an oil saver unit operatively assembled in upper and lower sections held together by kick-out clamps, which in an emergency, or accident, will be quickly and automatically unclamped by an upward pull of the oil well cable where it is operatively suspended in a well; and thus preventing a wrecking of the oil saver and a loss of a swabbing tool or the like.

A further purpose of my invention is to provide a practical and serviceable hydraulic fluid communicating means for the remote control of the oil pressure seal or resilient clamp utilized in my invention to prevent undesired escape of oil during a well swabbing operation.

I am able to obtain the above mentioned objects of my invention, by the construction of oil saver equipment described in this specification, recited in the claims, and illustrated in the drawings.

Referring to the drawings:

Figure 2 is a side elevation of my invention.

Figure 3 is a top view of my invention.

Figure 4 is a detail of the construction and operative fitting relation of one of the kick-out clamps holding the sections of my oil saver together.

Figure 5 is a detail of the operative assembly of one of my plunger pins for automatically releasing the kick-out pins.

Figure 6 is a detail of the fitting relation of my cable and the kick-out lug slidably carried thereby.

Figure 7 is a detail of one of the resilient clamp members with oil pockets therein.

Figure 1:
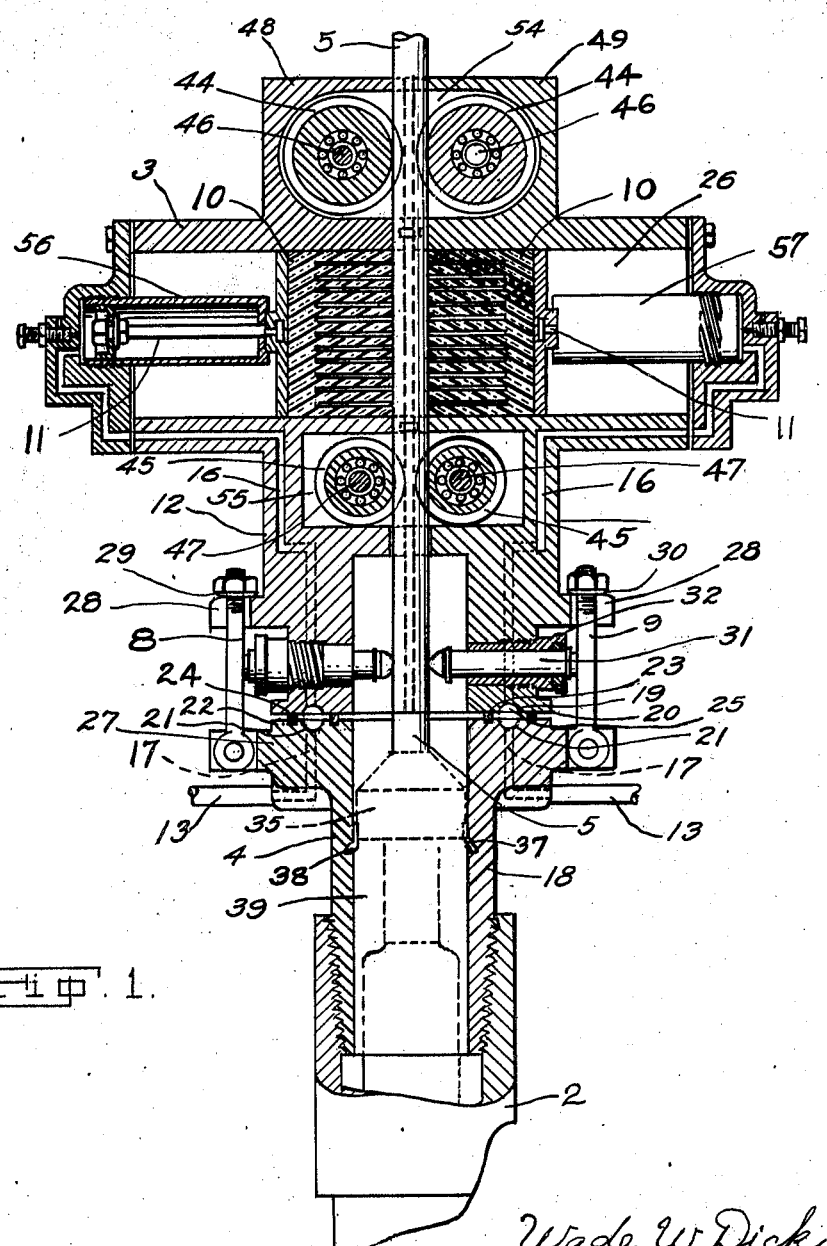
Figure 1 is a vertical half-section of my oil saver.

I shall now describe the oil saver of my invention, as I point out in detail, the preferable construction thereof, as I refer to such advantages in service and safety as will be derived from its use.

In the past, it has been the unfortunate experience of some oil well service men, to meet a tragic death while on duty under operating conditions requiring them to be stationed within an oil well derrick, high off the ground, on a cat-walk or other service platform, almost directly over the oil well and directly in line with what would amount to a tragic oil well fire when the oil or gas would catch fire.

It is thus my purpose in this invention, to provide not only means by which an operator may selectively regulate the functions of an oil saver by remote hydraulic control, but to provide an effective means of reducing to a minimum, the usually expensive and troublesome problems arising when a swabbing tool becomes broken off and lost from the cable, while withdrawing this tool from the well, and striking an oil saver not provided with my improvements.

The essential features of operative construction in my oil saver, will be found to be comprehensively explained in this specification, and illustrated in the drawings; wherein, an oil saver unit 1, is removably secured to an oil well casing 2 and preferably constructed in a manner forming an operative assembly of an upper section 3 and a lower section 4 which work together most effectively, to accomplish my purposes.

When drilling an oil well, there are times and circumstances under which it becomes advisable to effectively swab out the bottom of the oil well to increase the flow of oil from the well; but during this swabbing operation, there would be a substantial loss of oil out of the top of casing 2 if some means were not provided for effectively oil-sealing this casing to prevent loss of oil during the well swabbing operations, and withdrawing of the swabbing tools from the well.

I realize that other oil saving devices have been in service here-to-fore in connection with oil well swabbing operations, but such service has usually been attended by dangerous exposure of an oil saver operator to any possible oil well fires; and it is my purpose in this invention to provide means by which my oil saver may be successfully and efficiently controlled by remote hydraulic control without requiring the presence of the operator in the immediate line of exposure to possible oil well fires.

For instance, when an oil well is being drilled, casing 2 is let down in sections, and a cable 5 is suspended from a sheave wheel 6 at the top of a derrick 7, so that the top end of cable 5 is wound upon a drum to be lengthened for a longer suspension down in the oil well through casing 2.

It is a common practice, when drilling oil wells, to resort to swabbing operations at the bottom of the well, after a showing of oil is made, in order to facilitate an easier flow of oil to the surface up through casing 2.

During this swabbing operation, it is found desirable to provide, above casing 2, some sort of mechanism to prevent an excessive flow of oil out of the top of casing 2.

Thus, in my oil saver, I propose to accomplish at least two outstanding benefits that are much needed in this service; and that is to provide a remote hydraulic control for the oil saver; and also a construction of the oil saver permitting its assembled sections to be automatically parted in the event a swabbing tool should strike it while being withdrawn from an oil well, instead of tearing up the oil saver and losing the swabbing tool in the well.

In a careful analysis of the construction of my oil saver, it will be observed that upper section 3 of this oil saver unit, is detachably secured to lower section 4 by two or more kick-out clamp members 8 and 9, and this lower section 4 is either clamped to or threadably secured to the well casing or tubing 2 for the support of the oil saver unit.

While it is conceivable that my oil saver unit may be operated by remote control through electric relays and solenoids, and by other means well-known to the mechanical field; yet, I find it preferable to provide for my purposes, a remote hydraulic control for the oil seal or resilient cable clamp feature of my invention.

For instance, in order to effectively guard against an undesired loss of oil about cable 5 up through my oil saver 1, I am housing, for this purpose, a clamp mechanism within upper section 3 of my oil saver unit 1, wherein a pair of opposed resilient cable clamp members 10 are actuated by a pair of hydraulic plungers or rams 11 as they are selectively moved, respectively, from opposite directions in toward cable 5. Thus for this tightening adjustment of resilient clamp members 10 through a hydraulic adjustment of hydraulic rams 11, I am thus able to selectively tighten up the oil seal housing of cable 5.

It is obvious that I could control hydraulic rams 11, by direct manipulative contact with hydraulic valves that would be operatively secured to the housing construction 12 of upper section 3 of my oil saver; but I prefer to offer the most desirable safety operative construction of my oil saver by communicatively connecting a pair of hydraulic pressure fluid tubes 13 which will extend from hydraulic rams 11 out to a remote control apparatus 14 for the selective adjustment of resilient clamp members 10 through hydraulic ram members 11; so that the operator, when watching the oil saver in operation, will thus have a chance to attend to the necessary adjustments in clamp members 10, while still safely exercising this control from a remote control position 15 away from derrick 7.

It is conceivable that hydraulic pressure fluid tubes 13 could be connected directly to hydraulic rams 11 and to remote control apparatus 14; but I prefer to provide in upper section 3 of my oil saver, one or more hydraulic pressure fluid passages 16 defining a communicating channel through upper section 3 for the passage of hydraulic pressure fluid on its way to hydraulic rams 11.

In order to carry the desired remote control hydraulic pressure from hydraulic control unit 15 up to hydraulic rams 11, I find it desirable to connect hydraulic pressure tubes 13 with the lower section 4 of my oil saver unit, with these tubes 13 communicatively connected with an inner passage 17 running through housing 18 of my oil saver unit. Passages 17 in lower section 4 and passages 16 in upper section 3 are provided with a most practical inter-communicating means. That is, since upper section 3 and lower section 4 have their adjacent surfaces abutting, then I am providing preferably an annular channel 19 in the bottom surface 20 of upper section 3, and an annular channel 21 in the upper surface 22 in lower section 4, and I am providing two or more concentric annular gasket members 23 and 24 spaced apart, and each secured to one of the adjacent abutting faces 20 or 22 of upper section 3 or lower section 4, respectively, with these gasket members fixed in spaced relation, with channels 19 and 21 registering in the space between the gaskets 23 and 24, when upper section 3 is clamped to lower section 4 by kick-out clamp members 8 and 9.

Thus, by communicatively connecting hydraulic fluid passages 16 in upper section 3, and likewise communicatively connecting hydraulic fluid passages 17 of lower section 4 each with the annular communicating chamber 25 defined by gaskets 23 and 24 and channels 19 and 21 when section 3 is clamped to section 4, I am then providing a substantial and efficient means of carrying the hydraulic pressure fluids from remote control tubes 13 from lower section 4 up through upper section 3 and to hydraulic rams 11 from the remote control hydraulic feature of my oil saver, I am providing a practical, economical and efficient means of conducting the hydraulic pressure fluids through the oil saver unit of my invention, without the necessity of having any hydraulic control tubes hanging around the oil saver unit to cause any operative annoyances.

These resilient oil packing or oil seal clamping members 10 are each provided with a series of pockets or recesses adapted to catch a quantity of oil and serve as oil pockets to provide a more effective oil seal in the slidable gripping pressure contact of clamp members 10 with cable 5. These clamp members 10 may be made of rubber or other desirable resilient packing material sufficiently durable to withstand a strenuous service in this capacity.

These clamp members 10 are adapted to operatively and slidably move in chambers 26 of section 3 in their normal function as oil savers.

It will be noted that kick-out clamp members 8 and 9 are pivotally operative in their support preferably on lugs 27 of lower section 4; while these same kick-out clamp members or bolts 8 and 9 will operatively swing into engagement with lugs 28 of upper section 3 for holding these sections together.

However, lugs 28 are preferably curved on their top surfaces with a radius centered upon the center of pivotal support for kick-out clamps 8 and 9 on lugs 27 of section 4; while washers 29 on clamps 8 and 9 have a curved bottom surface 30 to facilitate the clamping and kick-out release of clamps 8 and 9 from lugs 28 on section 3.

In order to provide an effective and practical means for automatically parting section 3 from section 4 of my oil saver unit, in event of an emergency where a swabbing apparatus or the like may be, by over-sight or accident, pulled up to forcefully strike my oil saver unit, I am equipping my oil saver unit with a mechanical device which, in its operation, will automatically part these sections.

I achieve this purpose by utilizing two or more plunger pins 31 slidably carried in a position at an angle with cable 5 within a bearing 32 which is packed with means for preventing loss of oil through the bearing.

These plunger pins 31 are each provided with an inner-head 34, permitting the plunger pin 31 to be freely moved back and forth in bearing 32 without the plunger pin 31 at any time leaving the bearing.

The inner-ends 33 of plunger pins 31 are curved or rounded in a manner permitting an effective glancing blow to force the pins outwardly and quickly.

Thus, it will be seen that when I provide a conical lug 35 loosely encompassing cable 5 at a position below the inner-heads 33 of pins 31, and provide means on cable 5 for lifting lug 35, then in event the swabbing tool or end clamp of the cable strikes lug 35 as this tool is being lifted, then cable 5 will force the conical, sloping, top surface 36 of lug 35 up with a glancing blow against the inner-heads 33 of plunger pins 31, quickly forcing them with a violent plunge outwardly against kick-out clamps 8 and 9 dislodging the top end of each from lugs 28 causing them to fall open, releasing the top section 3 of my oil saver unit from lower section 4, permitting the same to be drawn up by cable 5, and thus prevent wrecking the oil saver and loss of the tool.

It will be noted that it will be preferable to permit lug 35 to rest against a notch or groove or recess 37 through the outward springing tendency of resilient springs 38 to straighten out when lug 35 is in normal resting position within the central chamber 39 of my oil saver unit.

It is obvious that my oil saver unit may be made to encompass cable 5 in more than one way; but I have found it economical and practical to provide upper section 3 in a construction permitting its assembly in sections, which will encompass cable 5 where they can be clamped together by swinging bolts 40, 41, 42 and 43.

It would be seen that I am providing two or more pairs of guide sheave pulleys 44 and 45 adapted to be made of material that is not capable of producing friction sparks that might ignite oil or gas, but which are adapted to function as effective aligning guides for cable 5 extending through my oil saver unit, and these sheaves are rotatably supported on bearing pins 46 and 47.

In the meantime, as an effective guard against loss of oil, upper section 3 of my oil saver is further divided into right and left sections 48 and 49, and a pair of gasket strips 50 and 51 will be operatively clamped in the space between the adjacent faces 52 and 53 through which space cable 5 will operatively extend.

It will be seen that guide sheaves 44 and 45 are housed in their operative position within chambers 54 and 55; cylinders 56 and 57, housing hydraulic rams 11.

It will be noted that lug 35 which is slidably carried by cable 5 is preferably provided with the spring members 58 and 59 adapted to resiliently engage an annular channel 60 on the inner surface of lower section 4 of my oil saver so as to provide an effective means of catching this lug 35 and holding it from dropping with the swabbing tool when the same is let down into casing 2.

Having thus described the nature of my invention, what I claim is:

1. As a new article of manufacture an oil saver for oil wells having a well casing, and comprising, an oil saver housing detachably connected with said casing for assembly in sections, an upper and a lower unit of which sections are operatively held together by a plurality of kick-out clamps, an oil well cable extending through said oil saver housing and means on said cable and said housing for automatically releasing said kick-out clamp in an emergency parting of said sections; said oil saver housing provided with resilient packing clamps slidably encompassing said cable, and hydraulic remote control means for selectively adjusting said packing clamps.

2. In combination with an oil well casing in an oil well and a drilling cable suspended therein from a support, an oil saver comprising a housing detachably connected with said casing and assembled in sections detachably connected, an upper and lower unit of said sections operatively held together by a plurality of kick-out clamps, said oil saver housing encompassing and engaging said cable above the casing, plunger pins operatively carried by one of said sections for releasing said kick-out clamps and a trip weight movable with said cable for actuating said plunger pins in a releasing blow against said kick-out clamps for automatically parting said upper and lower sections of the oil saver housing in an emergency; said oil saver unit operatively housing a pair of opposed resilient packing clamps slidably engaging said cable, and hydraulic remote control means for selectively adjusting said clamps and operatively and communicatively connected with remote control apparatus through communicating passages in said housing and through hydraulic fluid tubes, to permit an oil saver operator to perform his duties a safe distance from an accidental oil well fire during an oil well swabbing operation.

3. As a new article of manufacture, an oil saver for swabbing operations in an oil well and comprising, a sectional oil saver housing provided with selectively adjustable resilient cable clamps operatively connected with means for their remote control to provide fire safety for the operator, and means for the automatic parting of the sectional housing in the event of accidental striking of the oil saver when lifting a swabbing tool with said cable.

4. In an oil saver for oil wells having a well casing, and a drilling cable, the combination of a resilient adjustable cable clamp provided with a plurality of oil pockets, a plurality of guide sheaves for said cable and remote control hydraulic means for selectively adjusting said resilient clamp means, with means for detachably engaging said casing and means, for automatically effecting a parting of sectional members of said oil saver, in an emergency or accident, where the cable terminal is lifted against said oil saver.

5. An oil saver for oil wells, having a casing therein and a cable suspended through the oil saver and into the casing and comprising, an oil saver housing provided with opposed resilient clamps operatively connected for a remote hydraulic control of their movements, said housing shaped to define an upper and a lower section detachably connected, a lug encompassing said cable within said housing and a plurality of plunger pins slidably registering in position to receive a glancing blow from said lug to effect an automatic release of said kick-out clamps when said cable may be lifted from an oil well far enough to strike a swabbing tool and the like, against said oil saver.

6. As a new article of manufacture, an oil saver for use in swabbing oil wells wherein an oil well cable is suspended into an oil well casing, and comprising a sectional oil saver housing, a resilient cable clamp operatively supported therein, hydraulic plungers for selectively actuating said clamps and a remote control means communicatively connected with said hydraulic plungers for the selective safe remote hydraulic control of said clamps, said housing operatively assembled in sections, and means connected with said cable for automatically effecting a parting of said sections in the event of the lifting of swabbing tools and the like, operatively suspended within said casing by said cable, to a level where they may strike said oil saver.

7. As a new article of manufacture, an oil saver adapted to be operatively connected with an oil well casing and cable when swabbing an oil well and comprising, a sectional oil saver housing provided with opposed resilient clamp members selectively adjustable in their clamping engagement of said cable, oil seal pockets provided in said clamp members, hydraulic plungers actuating said clamps, a hydraulic pump and remote control hydraulic valves communicatively connected with said hydraulic plungers for actuating said clamp members at will, kick-out clamp members holding said sections of said housing together, and means connected with said cable and one of said sections for automatically releasing said kick-out clamp members in an emergency.

8. As a new article of manufacture, an oil saver adapted to be operatively connected with an oil well casing and cable when swabbing an oil well, and comprising, a sectional oil saver housing provided with opposed resilient clamp members selectively adjustable in their clamping engagement of said cable, oil seal pockets provided in said clamp members, hydraulic plungers actuating said clamps, a hydraulic pump and remote control hydraulic valves communicatively connected with said hydraulic plungers for actuating said clamp members at will, kick-out clamp members holding said sections of said housing together, and means connected with said cable and one of said sections for automatically releasing said kick-out clamp members in an emergency; said sections of said housing shaped to define upper and lower members thereof and each provided with inter-communicating hydraulic fluid passages within the housing and said sections shaped on their adjacent abutting faces to define opposed annular channels and two or more annular gasket members concentrically spaced inside and outside of said channels to define a hydraulic annular communicating channel between the hydraulic fluid passages of the lower section and corresponding hydraulic fluid passages of the upper section of said housing.

9. An oil saver for oil wells and adapted to be removably secured to an oil well casing in position to encompass an oil well cable suspended down through the oil saver and into said casing, and comprising, a sectional housing provided with operatively opposed and selectively adjustable resilient clamp members for slidably engaging said cable, means for mechanically controlling the selective adjustment of said clamp members and means communicatively connected with said mechanical control means for the remote control of said mechanical actuating means, means for operatively holding said sections of said oil saver together and means connected with said cable and with one of said sections for the emergency release of said holding means for the assembled sections in the event of an emergency.

10. An oil saver for oil wells and having a detachable connection with an oil well casing and adapted to encompass and resiliently engage a drilling cable extending into the casing, the combination comprising an oil saver housing having an upper and a lower section with the upper section provided with opposed resilient clamp members operatively encompassing and resiliently gripping said cable and connected with means for their selective adjustment, further provided with a plurality of pairs of guide sheaves rotatably engaging said cable, and a plurality of opposed plunger pins slidably adjustable and disposed at an angle with said cable; said lower section of said oil saver provided with means for the detachable engagement thereof with said casing, provided with a plurality of kick-out clamps, each respectively registering in front of the outer end of said plunger pins, and slidably clamping engaging lugs adjacent the lower end of said upper section, means carried by said cable and housed within said lower section of the oil saver for striking said plunger pins a glancing blow against their inner ends, and thus effecting a quick kick-out release of the kick-out clamps holding said upper and lower sections of the oil saver together, when in event of an emergency, said cable may accidentally lift a suspended load to strike said oil saver.

11. An oil well cable, an oil saver housing having an upper and lower section detachably connected and together encompassing said cable, said upper section shaped to define opposed chambers on opposed sides of said cable and a pair of opposed resilient cable engaging clamp members slidably movable within said chambers, a plurality of pairs of guide sheave chambers adjacent opposed sides of said cable and guide sheaves rotatably supported in each for contact with said cable, a hydraulic plunger means operatively connected with each of said resilient clamp members, and hydraulic control means connected with each of said plungers for the remote control thereof through hydraulic fluid communicating means, a plurality of kick-out clamps establishing said detachable connection between said upper and lower sections of the oil saver, a plurality of opposed releasing members each operatively supported in position to forcefully disengage said kick-out clamp members, a releasing lug slidably encompassing said cable below said releasing members and shaped to define a sloping top surface for striking said releasing members a glancing blow to effect an emergency release of said kick-out clamps.

12. In an oil saver for oil wells, a casing, a drilling cable extending through this saver unit and into the casing, the combination of a top section of the saver unit provided with two or more resilient laterally adjustable cable clamp members shaped to define in each a plurality of oil pockets, and means operatively connected with each of said resilient clamp members for selectively adjusting the clamping stress of each against said cable, said top section also provided with a plurality of cable guide sheaves each made of material not capable of producing a friction spark; with a lower section of said saver unit detachably secured to the top end of said oil well casing and provided with a plurality of kick-out clamp members establishing detachable engagement with said top section, a corresponding number of horizontally disposed plunger pins carried by said top section and extending at their inner ends to a point near said cable, and registering at their outer ends in a position near said kick-out clamps, said plunger pins tapered for a glancing blow at their inner ends; said top saver section and said lower section of the saver shaped to define in their fitting relation longitudinally aligned chambers through which said cable extends, and a lug with a sloping top surface encompassing said cable below said plungers, two or more spaced concentric gasket members registering between adjacent faces of said top section and lower section of said oil saver unit, and an annular recess in each of the adjacent surfaces of adjacent faces of said oil saver sections between said gasket members, one or more hydraulic pressure fluid channels communicatively connecting said sections of the oil saver through the annular space between said concentric gaskets on the adjacent faces of said top and lower sections of the oil saver unit and said hydraulic pressure fluid channels adapted to be communicatively connected with a remote control means for selectively adjusting the pressure of said resilient clamps against said cable through hydraulic pressure.

13. As an article of manufacture an oil saver for use in swabbing oil wells and comprising a sectional housing having upper and lower sections detachably connected in position to encompass said cable, said upper section provided with opposed chambers on opposed sides of said cable, a pair of opposed resilient rubber oil pocketed engaging clamps slidably movable in a gripping engagement of said cable, recesses on opposed sides of said cable within said housing, and opposed sheave pulleys rotatably supported in opposed pairs within recesses about said cable, a hydraulic plunger operatively and controllably connected with each of said resilient clamp members, a plurality of pivoted kick-out clamping bolts for detachably and operatively holding said housing sections together, said bolts each having at their free ends, a washer having its bottom surface convex and an integral lug arcuately shaped on one of said sections for the quick slidable release of said kick-out clamping bolt, a plurality of double-headed plunger pins slidably carried by one of said sections and registering at their inner ends adjacent said cable and at their outer ends adjacent said kick-out clamps, a kick-out lug slidably encompassing said cable and shaped to define a conical top surface and a resilient spring catch for its inactive support on the bottom section of said housing.

WADE W. DICK.